SOLID STATE STEPPING SWITCH

Filed Dec. 2, 1963

Jimmy W. Cosby,
*INVENTOR.*
Harry M. Saragovitz
BY Edward J. Kelly
Herbert Berl
Jack W. Voigt United States Patent Office 3,237,029
Patented Feb. 22, 1966

3,237,029
SOLID STATE STEPPING SWITCH

Jimmy W. Cosby, Rogersville, Ala., assignor to the United States of America as represented by the Secretary of the Army Filed Dec. 2, 1963, Ser. No. 327,561
16 Claims. (Cl. 307—88.5)
(Granted under Title 35, U.S. Code (1952), sec. 266)

The invention described herein may be manufactured and use by or for the Government for governmental purposes without the payment of any royalty thereon.

This invention relates generally to a calibrating system and more particularly to an inflight voltage calibrator for calibrating a telemetry system consisting of voltage measuring oscillators.

The present state of instrumentality aboard missiles has presented the need for accurate calibration of telemetry instruments during the time highly different environments are presented to the telemetry systems on these missiles while in flight. Some missiles have a full eighteen channel telemetry package which must be calibrated to a high degree of accuracy. There is a need for a device which will provide the calibration signal for a full eighteen channel telemetry package without using any additional amplifiers or circuits which are needed by most commercial units. Further, there is need for a small and yet versatile calibrating unit to reduce cost and weight in missiles.

It is, therefore, an object of this invention to provide a calibrator suitable for use in missiles.

A further object of the present invention is to provide a reduction in the number of component parts while performing the same function of more elaborate calibrators.

A still further object is to provide a single calibrator for handling a full eighteen channel telemetry package without using any additional amplifiers or circuits.

Advantages of this invention for inflight calibration are the cost, accuracy and versatility. One of the unique features of this invention is the triggering circuit which acts like a "one-shot multivibrator" and has a very small number of parts. In has a variable "on time" and its use is not limited to calibration alone but could be used anywhere its small size, cost and versatility would be of advantage. Some additional uses would be in solid state commutators, missile roll position indicators, and it could easily be made to code information of some types to use one data channel for information that would normally require two.

These and other objects and advantages of the present invention will become apparent from the following detailed description and from the accompanying drawings in which.

Figures 1, 2:
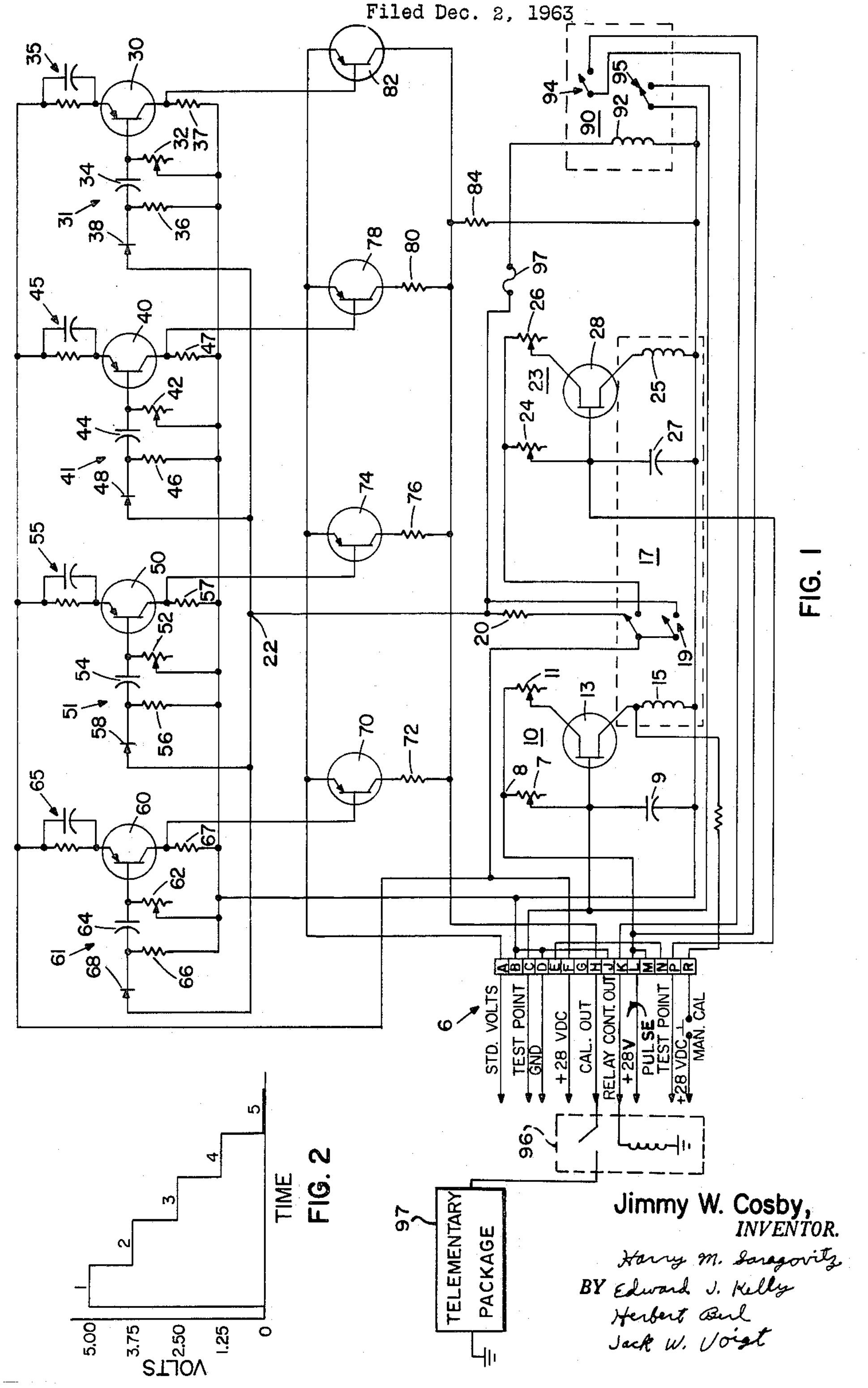
FIGURE 1 is a schematic circuit diagram according to the invention.
FIGURE 2 shows a waveform illustrative of the operation of the invention in which the abscissa is time and the ordinate is volts.

In FIGURE 1 reference numeral 6 generally indicates a panel board having terminals A–R to start the calibrating cycle, a long pulse of 28 volts D.C. is applied to junction 8 by way of terminal L. This will start the RC network formed by resistor 7 and capacitor 9 of timer 10 to charging. When capacitor 9 charges to a level set by resistor 11 (approximately 10 volts, depending on how much time delay is needed) unijunction diode 13 conducts and causes current to flow through coil 15 of relay 17 (indicated generally by a broken line) to close switch contacts 19 to their bottom position, thereby bypassing resistor 20 and applying a full 28 volts D.C. from terminal F to junction 22 and at the same time starting reset timer circuit 23 consisting of resistors 24 and 26, capacitor 27 and unijunction diode 28.

The sudden changes in voltage occurring at junction 22 activates trigger circuits 31, 41, 51 and 61 and causes triodes (specifically transistors) 30, 40, 50 and 60 to conduct which in turn cause transistors 70, 74, 78 and 82 to conduct.

With transistors 70, 74, 78 and 82 all conducting and since the collector load for transistor 82 is formed by a resistor 84 (in the order of 1,700 ohms) connected across the output (which is connected to terminal H), the full instrumentation standard at terminal A is measured across it and Step No. 1 of FIGURE 2 is generated. When the time set by the RC circuit of resistor 32 and capacitor 34 of trigger circuit 31 has elapsed, transistor 30 turns off and opens the circuit to transistor 82, and a voltage divider is formed by resistor 72, 76 and 80 in series with resistor 84 which causes Step No. 2, shown in FIGURE 2, to be generated. Steps 3 and 4 are generated in the same manner as Step No. 2, and as transistors 40 and 50 are turned off by their respective RC circuits 42–44 and 52–54, the ratios between resistors 72, 76, 80 and 84 are changed in such a way as to give the proper voltage drop across terminal H so as to give Steps 3 and 4 of FIGURE 2.

Step No. 5 of FIGURE 2 is created when the RC timing circuit (resistor 62 and capacitor 64) of the trigger circuit 61 causes transistor 60 to turn off which in turn switches off transistor 70 causing the voltage across the output to drop to zero.

The length of Steps No. 1–4 is controlled by individually adjustable resistors 32, 42, 52 and 62 respectively. Resistors 32, 42, 52 and 62 are independent of each other.

The length of Step No. 5 and/or the total length of calibration is controlled by adjustable resistor 24 of the reset timer 23. When diode 28 conducts, coil 25 of relay 17 is energized and sets switch contacts 19 to their top position, thereby resetting the timer 10 and making the calibrator ready for another cycle.

Relay 90 and its associated circuit performs three important functions. First, when the timer 10 sets switch 19 in its bottom position, resistor 20 is bypassed and full voltage is applied to coil 92 of relay 90. The resultant increase in current through coil 92 closes switches 94 and 95. The closing of switch 94 connects the voltage on terminal L to terminal K. Terminal K is connected to another relay 96 which connects the telemetry package 97, to be calibrated, to output terminal H. When switch 94 is opened, the telemetry package is disconnected.

Second, the closing of switch 95 provides a path for capacitor 9 to discharge. This allows the timer 10 to prepare for another calibrating cycle faster.

Third, a 1⁄10 ampere slow acting fuse 97 in series with coil 92 of relay 90 provides a safety feature which in case of any failure will set the system back to its original mode and therefore cause a minimum of data loss. If reset timer 23 fails to act, fuse 97 will blow out relay 90 will then disconnect the telemetry package as explained above.

Switches 94 and 95 are spring biased to their open position.

Resistors 36, 46, 56 and 66 are connected to capacitors 34, 44, 54 and 64 so as to provide a discharge path for said capacitors. Diodes 38, 48, 58 and 68 are blocking diodes to prevent the capacitors from discharging through coil 92 of relay 90. Filters 35, 45, 55 and 65 are in circuit to eliminate transients. Resistors 37, 47, 57 and 67 are loading resistors for triggers 31, 41, 51 and 61.

A standard voltage on the order of 2–10 volts D.C. is applied to terminal A. Five volts was used to get the output shown in FIGURE 2. Terminals B, D and J are all connected to ground. Terminal C and P are provided so that impedances checks may be made on the calibrator itself. Terminals E and N are connected to each other. A steady state D.C. voltage is connected to terminal F. Terminal G is left open for possible future use. Terminal H is connected to the load. Terminal K is connected as described above. A pulse of D.C. voltage of sufficient duration to cause relay 17 to set switch contacts 19 to their bottom position is applied to terminals L and M. Terminal R is provided with a 28 volts D.C. supply and a switch so that the time delay of timer 10 may be bypassed.

This invention will give five linear steps which are variable from 10 to 500 ms. each. Although the steps are shown as being equal in time in FIGURE 2, this need not be the case as the termination of each step is determined by a individually adjustable resistor. Therefore the steps could be of different length in time. The total length of calibration is from 50 ms. to 1 minute. The range over which the timer 10 will operate is from 10 seconds to 5 minutes and is variable with a screwdriver adjustment of its resistors. The output is taken across a 1700 ohm resistor 84 and when the fact that the normal load of an eighteen channel telemetry unit is approximately 10,000 ohms is taken into account, it can be seen that the loading effect is small.

While the invention has been described with reference to a preferred embodiment thereof, it will be apparent that various modifications and other embodiments thereof will occur to those skilled in the art with the scope of the invention. Accordingly, I desire the scope of my invention to be limited only by the appended claims.

I claim:

1. A triggering circuit comprising a source of D.C. voltage, a load, a first resistor, a switch means, a capacitor, a second resistor and a control means having input terminals and output terminals; a first series circuit containing said source, said output terminals and said load; a second series circuit containing the source, said switch means, second resistor and said capacitor; said switch means having contacts connected to said first resistor such that in its open position said first resistor is connected in said second series circuit and in the switch's closed position said first resistor is bypassed in said second series circuit, and connection means between said second series circuit and the input terminals of said control means so as to make the triggering circuit act like a one-shot multivibrator responsive to the closing of said switch means.

2. A triggering circuit as set forth in claim 1, wherein said control means is a transistor having emitter, collector and base electrodes; said input terminals being the emitter and base electrodes, and said output terminals being the emitter and collector electrodes.

3. A triggering circuit as set forth in claim 2, wherein one end of said first resistor is connected to a junction between said source and said transistor.

4. A triggering circuit as set forth in claim 3 further including a diode connected between the other end of said first resistor and one end of said capacitor.

5. A triggering circuit as set forth in claim 3, wherein the base electrode is connected to the junction formed by said capacity and said second resistor.

6. A triggering circuit as set forth in claim 3, wherein said second resistor is an adjustable resistor so as to adjust the timing of the circuit.

7. A triggering circuit as set forth in claim 5, wherein said second resistor is an adjustable resistor.

8. A triggering circuit comprising a source of D.C. voltage, a transistor having emitter, collector, and base electrodes, a series circuit consisting of one side of the source, the emitter and collector electrodes of said transistor, a load circuit, the other side of the source and the source all in the order set forth; a second series circuit comprising in the order set forth said one side of the source, a first resistor, a diode, one side of a capacitor, said capacitor, the other side of said capacitor, an adjustable second resistor, said other side of the source and said source; a third resistor connected between said one side of the capacitor and said side of the source; the base of said transistor being connected to said other side of the capacitor; and a controlled switch means connected across said first resistor.

9. A stepping switch comprising a source of D.C. voltage, a first transistor and a first resistor all connected in a series circuit; at least one unit comprising a second transistor connected in series with a second resistor; each unit being connected in parallel with said first transistor; a load connected in parallel with said first resistor; and separate triggering means connected to each transistor input circuit.

10. A stepping switch as set forth in claim 9 in which said triggering means performs the function of a one-shot multivibrator.

11. A stepping switch as set forth in claim 10 including a single timer means for starting the operation of all of said triggering means simultaneously after a preset time delay.

12. A stepping switch as set forth in claim 11 further including a relay means having contacts connected to said load and said first resistor for connecting and disconnecting said load and said resistor.

13. A stepping switch as set forth in claim 12 in which said relay means is activated by said timer means.

14. A stepping switch as set forth in claim 13 further including a reset timer means, whereby after an adjustable time delay, said reset timer will reset the timer means and deactivate the relay means.

15. A stepping switch as set forth in claim 14 farther including a slow acting fuse in series with said relay, whereby said fuse will deactivate the relay in the event said reset timer fails to operate after a predetermined period of time.

16. A stepping switch as set forth in claim 15, wherein said load is a telemetry package which is to be calibrated.

No references cited.

ARTHUR GAUSS, *Primary Examiner.*

J. BUSCH, *Assistant Examiner.*